(12) United States Patent
Iwamoto

(10) Patent No.: US 10,713,797 B2
(45) Date of Patent: Jul. 14, 2020

(54) IMAGE PROCESSING INCLUDING SUPERIMPOSED FIRST AND SECOND MASK IMAGES

(71) Applicant: CANON KABUSHIKI KAISHA, Tokyo (JP)

(72) Inventor: Kazunari Iwamoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/151,525

(22) Filed: Oct. 4, 2018

(65) Prior Publication Data

US 2019/0114783 A1    Apr. 18, 2019

(30) Foreign Application Priority Data

Oct. 13, 2017 (JP) ................................ 2017-199712

(51) Int. Cl.

| | |
|---|---|
| *G06T 7/20* | (2017.01) |
| *H04N 5/232* | (2006.01) |
| *G11B 20/12* | (2006.01) |
| *G06F 3/0488* | (2013.01) |
| *G06T 5/00* | (2006.01) |
| *G06T 1/00* | (2006.01) |
| *H04N 7/18* | (2006.01) |
| *G08B 13/196* | (2006.01) |

(52) U.S. Cl.
CPC .............. *G06T 7/20* (2013.01); *G06F 3/0488* (2013.01); *G06T 1/0007* (2013.01); *G06T 5/002* (2013.01); *G11B 20/12* (2013.01); *H04N 5/23229* (2013.01); *G06T 2207/10024* (2013.01); *G08B 13/19663* (2013.01); *G08B 13/19686* (2013.01); *H04N 7/18* (2013.01)

(58) Field of Classification Search
None
See application file for complete search history.

(56) References Cited

U.S. PATENT DOCUMENTS

| | | |
|---|---|---|
| 8,514,681 B2 | 8/2013 | Ikeda et al. |
| 2009/0128632 A1 | 5/2009 | Goto et al. |
| 2010/0202276 A1 | 8/2010 | Ikeda et al. |
| 2015/0339519 A1* | 11/2015 | Ueta ...................... H04N 5/275 382/103 |
| 2016/0026875 A1* | 1/2016 | Matsumoto ...... H04N 21/21805 348/143 |
| 2017/0116461 A1* | 4/2017 | Kakita ............... G06K 9/00201 |
| 2018/0033151 A1* | 2/2018 | Matsumoto ............... G06T 7/20 |
| 2018/0122033 A1* | 5/2018 | Mayuzumi ................ G06T 7/11 |
| 2018/0255326 A1* | 9/2018 | Oya ................... H04N 21/2347 |

FOREIGN PATENT DOCUMENTS

JP    2010-186507 A    8/2010

OTHER PUBLICATIONS

Feb. 21, 2019 European Search Report in European Patent Appln. No. 18195896.8.

* cited by examiner

*Primary Examiner* — Thomas D Lee
(74) *Attorney, Agent, or Firm* — Venable LLP

(57) ABSTRACT

It is determined, when a region of a moving object detected from an image overlaps a fixed region in the image, whether to superimpose a first mask image to be drawn in the region of the moving object on a second mask image to be drawn in the fixed region, based on an image feature amount of the region of the moving object. The drawing of the first mask image is controlled in accordance with this determination result.

17 Claims, 9 Drawing Sheets

IMAGE PROCESSING INCLUDING SUPERIMPOSED FIRST AND SECOND MASK IMAGES

BACKGROUND OF THE INVENTION

Field of the Invention

The present invention relates to an image processing apparatus, an image processing method, and a non-transitory computer-readable storage medium, particular to a technique for drawing a mask image on an image.

Description of the Related Art

Conventionally, there is known a technique for superimposing a mask image on a specific region on an image in consideration of security and privacy. In the following description, a mask image superimposed on a specific region on an image as described above will be referred to as a fixed mask.

There is known a technique for superimposing, when a moving object exists on an image, a mask image on the region on the image on which the moving object exists in consideration of the privacy of the moving object. In the following description, a mask image superimposed on a moving object as described above will be referred to as a moving object mask.

For example, Japanese Patent Laid-Open No. 2010-186507 discloses a method of performing the processing of superimposing a fixed mask on a region where a person continues to exist and performing the processing of superimposing a moving object mask on a region where a person moves for the purpose of considering the privacy of a worker when a video of a workplace is distributed.

The conventional technique disclosed in Japanese Patent Laid-Open No. 2010-186507, however, suffers from the problem that the condition of a worker cannot be checked in the region on which a fixed mask is superimposed. Accordingly, even if, for example, a worker who is performing work in a region on which a fixed mask is superimposed falls over, the observer of the video cannot notice the situation. In this case, applying a moving object mask to the above region instead of a fixed mask can solve the above problem. However, a fixed mask serves to hide an object other than a moving object, which exists in a workplace, in consideration of security and privacy as well as giving consideration to the privacy of a worker. For this reason, there is a possibility that a moving mask cannot be applied to an entire workplace.

SUMMARY OF THE INVENTION

The present invention has been made in consideration of the above problem, and provides a technique for enabling a check on a moving object in a fixed region on an image even if a mask image is drawn in the fixed region.

According to one aspect of the present invention, there is provided an image processing apparatus comprising: a determination unit configured to determine, when a region of a moving object detected from an image overlaps a fixed region in the image, whether to superimpose a first mask image to be drawn in the region of the moving object on a second mask image to be drawn in the fixed region, based on an image feature amount of the region of the moving object; and a control unit configured to control drawing of the first mask image in accordance with a determination result obtained by the determination unit.

According to another aspect of the present invention, there is provided an image processing method performed by an image processing apparatus, the method comprising: determining, when a region of a moving object detected from an image overlaps a fixed region in the image, whether to superimpose a first mask image to be drawn in the region of the moving object on a second mask image to be drawn in the fixed region, based on an image feature amount of the region of the moving object; and controlling drawing of the first mask image in accordance with a determination result obtained in the determining.

According to still another aspect of the present invention, there is provided a non-transitory computer-readable storage medium storing a computer program for causing a computer to function as a determination unit configured to determine, when a region of a moving object detected from an image overlaps a fixed region in the image, whether to superimpose a first mask image to be drawn in the region of the moving object on a second mask image to be drawn in the fixed region, based on an image feature amount of the region of the moving object, and a control unit configured to control drawing of the first mask image in accordance with a determination result obtained by the determination unit.

Further features of the present invention will become apparent from the following description of exemplary embodiments (with reference to the attached drawings).

DESCRIPTION OF THE EMBODIMENTS

Figure 1:
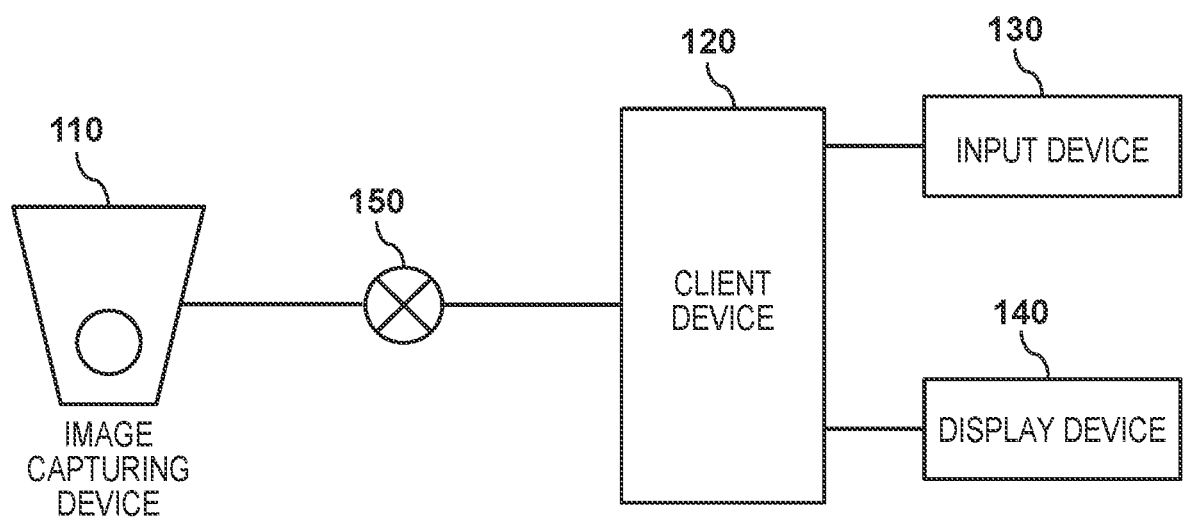
FIG. 1 is a block diagram showing an example of the configuration of a system.

The embodiments of the present invention will be described in detail below with reference to the accompanying drawings. The following embodiments each will show an example of concretely carrying out the present invention, and each are a specific embodiment of the configuration described in the scope of claims.

First Embodiment

In the first embodiment, when the region of a moving object detected from an image overlaps a fixed region in the image, it is determined, based on the image feature amount of the region of the moving object, whether to superimpose a first mask image to be drawn in the region of the moving object on a second mask image to be drawn in the fixed region. The embodiment controls the drawing of the first mask image in accordance with this determination result.

An example of the configuration of a system according to this embodiment will be described first with reference to FIG. 1. As shown in FIG. 1, the system according to the embodiment includes an image capturing device 110, a client device 120, an input device 130, and a display device 140.

The image capturing device 110 will be described first. The image capturing device 110 is an image capturing device such as a network camera. This device captures a movie or still image in a physical space in accordance with image capturing parameters such as a posture and field angle set by the client device 120. The movie or still image captured by the image capturing device 110 is transmitted to the client device 120 via a network 150.

The network 150 will be described next. The network 150 is constituted by a plurality of routers, switches, cables, and the like satisfying a communication standard such as Ethernet®. In this embodiment, the communication standard, size, and configuration of the network 150 are not specifically limited as long as the network enables communication between the image capturing device 110 and the client device 120. For example, the network 150 may be implemented by the Internet, a wired LAN (Local Area Network), a wireless LAN, WAN (Wide Area Network), or the like.

The client device 120 will be described next. The client device 120 is a device functioning as an image processing apparatus such as a personal computer, server apparatus, or tablet apparatus. The client device 120 receives a movie or still image as a captured image from the image capturing device 110 via the network 150. When the image capturing device 110 transmits a movie, the client device 120 receives the image of each frame constituting the movie as a captured image. In contrast to this, when the image capturing device 110 transmits a still image, the client device 120 receives the still image as a captured image.

The client device 120 detects a moving object from the received captured image and extracts the image feature amount of the region of the moving object (moving object region). If the moving object region overlaps a fixed region in the captured image, the client device 120 determines, based on the image feature amount, whether to superimpose the first mask image to be drawn in the moving object region on the second mask image to be drawn in the fixed region. The client device 120 draws the first mask image in the moving object region on the captured image, and draws the second mask image in the fixed region. The client device 120 controls the drawing processing in accordance with the determination result, and displays the captured image after the control on the display device 140.

The input device 130 will be described next. The input device 130 includes user interfaces such as a keyboard, a mouse, and a touch panel. The user can input various types of instructions to the client device 120 by operating the input device 130.

The display device 140 will be described next. The display device 140 is implemented by a CRT, liquid crystal display, or the like. The display device 140 can display a processing result obtained by the client device 120 by using images, characters, and the like. FIG. 1 shows the client device 120, the input device 130, and the display device 140 as separate devices. However, the configuration of these devices is not limited to this. For example, the devices may be integrated into one device. Alternatively, the client device 120 and the display device 140 may be integrated, or the input device 130 and the display device 140 may integrated. Alternatively, the client device 120 and the image capturing device 110 may be integrated.

Figure 2A:
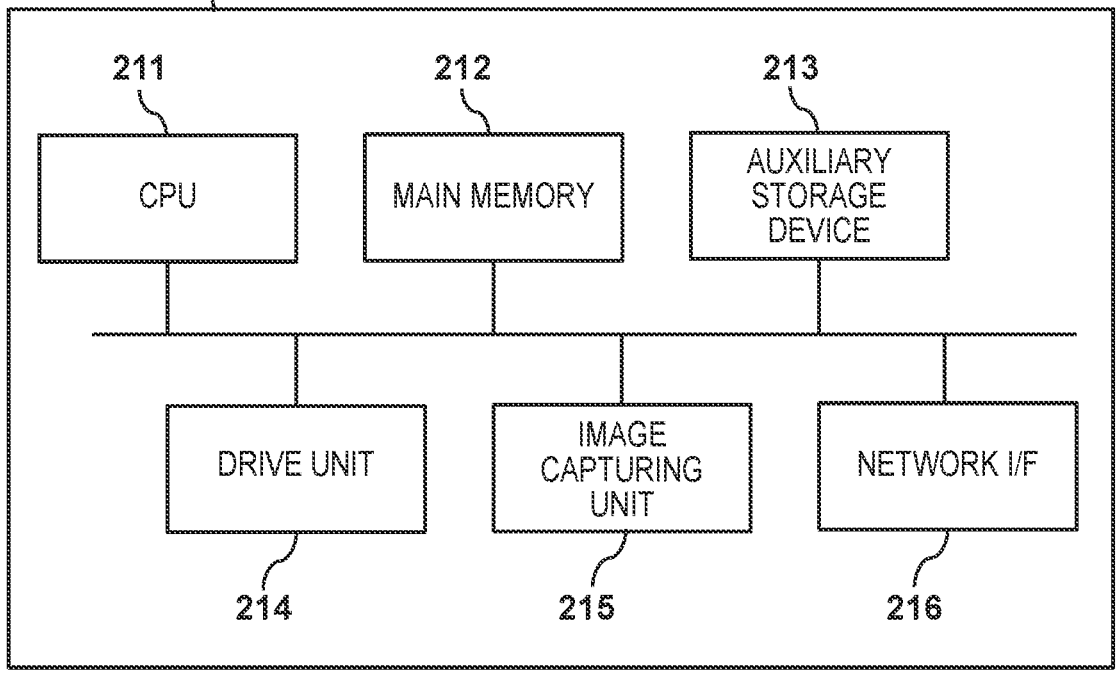
FIGS. 2A and 2B are block diagrams showing examples of the hardware configurations of an image capturing device 110 and a client device 120.

An example of the hardware configuration of the image capturing device 110 will be described next with reference to the block diagram of FIG. 2A. Note that the configuration shown in FIG. 2A is merely an example of a configuration that can be applied to the image capturing device 110, and can be modified and changed as needed.

A CPU 211 executes processing by using computer programs and data stored in a main memory 212. With this processing, the CPU 211 controls the overall operation of the image capturing device 110, and also executes or controls each process described later as a process to be performed by the image capturing device 110. For example, the CPU 211 implements the functions of functional units, namely an image capturing control unit 311, a signal processing unit 312, a drive control unit 313, and a communication control unit 314 shown in FIG. 3A by executing processing using computer programs and data stored in the main memory 212. These functional units will be described later.

The main memory 212 is a storage device such as a RAM (Random Access Memory). The main memory 212 has an area for storing computer programs and data loaded from an auxiliary storage device 213, captured images obtained by an image capturing unit 215, and various types of data received from the client device 120 via a network I/F 216. The main memory 212 also has a work area to be used when the CPU 211 executes various types of processes. As described above, the main memory 212 can provide various types of areas, as needed.

The auxiliary storage device 213 is a large-capacity information storage device such as an HDD (Hard Disk Drive), a ROM (Read Only Memory), or an SSD (Solid State Drive). The auxiliary storage device 213 stores an OS (Operating System) and computer programs and data for making the CPU 211 execute processes described later as a processes to be performed by the image capturing device 110. The auxiliary storage device 213 also stores data received from the client device 120 (for example, the above image capturing parameters) via the network I/F 216. Computer programs and data stored in the auxiliary storage device 213 are loaded into the main memory 212, as needed, under the control of the CPU 211, to be processed by the CPU 211.

A drive unit 214 drives the image capturing unit 215 based on the image capturing parameters received from the client device 120 so as to control the posture (image capturing direction), field angle, and the like of the image capturing unit 215. Control targets by the drive unit 214 are not limited to specific targets. Such control targets may be the posture and field angle of the image capturing unit 215, or only one of them, or other targets (for example, the position of the image capturing unit 215). In addition, the position, posture, field angle, and the like of the image capturing unit 215 need not be fixed. In this case, the drive unit 214 need not be provided.

The image capturing unit 215 includes an image sensor and an optical system, and forms an image of an object on the image with the intersection point between the optical axis of the optical system and the image sensor being an image capturing center. Such image sensors include a CMOS (Complementary Metal-Oxide Semiconductor) and a CCD (Charge Coupled Device). The network I/F 216 is an interface that is used by the image capturing device 110 to perform data communication with the client device 120 via the network 150.

Figure 2B:
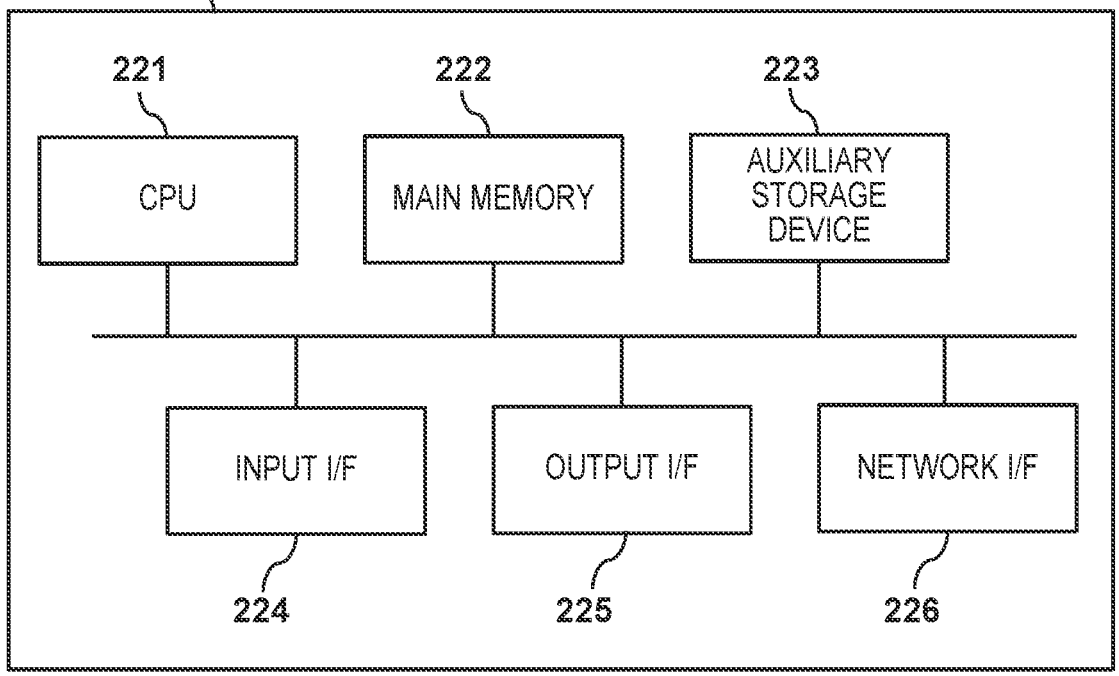

An example of the hardware configuration of the client device 120 will be described next with reference to the block diagram of FIG. 2B. Note that the configuration shown in FIG. 2B is merely an example of a configuration that can be applied to the client device 120, and can be modified and changed as needed.

A CPU 221 controls the overall operation of the client device 120 and also executes or controls each process described later as a process to be performed by the client device 120 by executing processes using computer programs and data stored in a main memory 222. For example, the CPU 221 implements the functions of the respective functional units shown in FIG. 3B by executing processing using computer programs and data stored in the main memory 222. These functional units shown in FIG. 3B will be described later.

The main memory 222 is a storage device such as a RAM (Random Access Memory). The main memory 222 has an area for storing computer programs and data loaded from an auxiliary storage device 223 and various types of data (for example, captured images) received from the image capturing device 110 via a network I/F 226. The main memory 222 also has a work area to be used when the CPU 221 executes various types of processes. As described above, the main memory 222 can provide various types of areas, as needed.

The auxiliary storage device 223 is a large-capacity information storage device such as an HDD (Hard Disk Drive), a ROM (Read Only Memory), or an SSD (Solid State Drive). The auxiliary storage device 223 stores an OS (Operating System) and computer programs and data for making the CPU 221 execute processes described later as processes to be performed by the client device 120. The auxiliary storage device 223 also stores various types of data received from the image capturing device 110 (for example, captured images) via the network I/F 226. Computer programs and data stored in the auxiliary storage device 223 are loaded into the main memory 222, as needed, under the control of the CPU 221, to be processed by the CPU 221.

An input I/F 224 is an interface for connecting the input device 130 to the client device 120. An output I/F 225 is an interface for connecting the display device 140 to the client device 120. The network I/F 226 is an interface that is used by the client device 120 to perform data communication with the image capturing device 110 via the network 150.

Figure 3A:
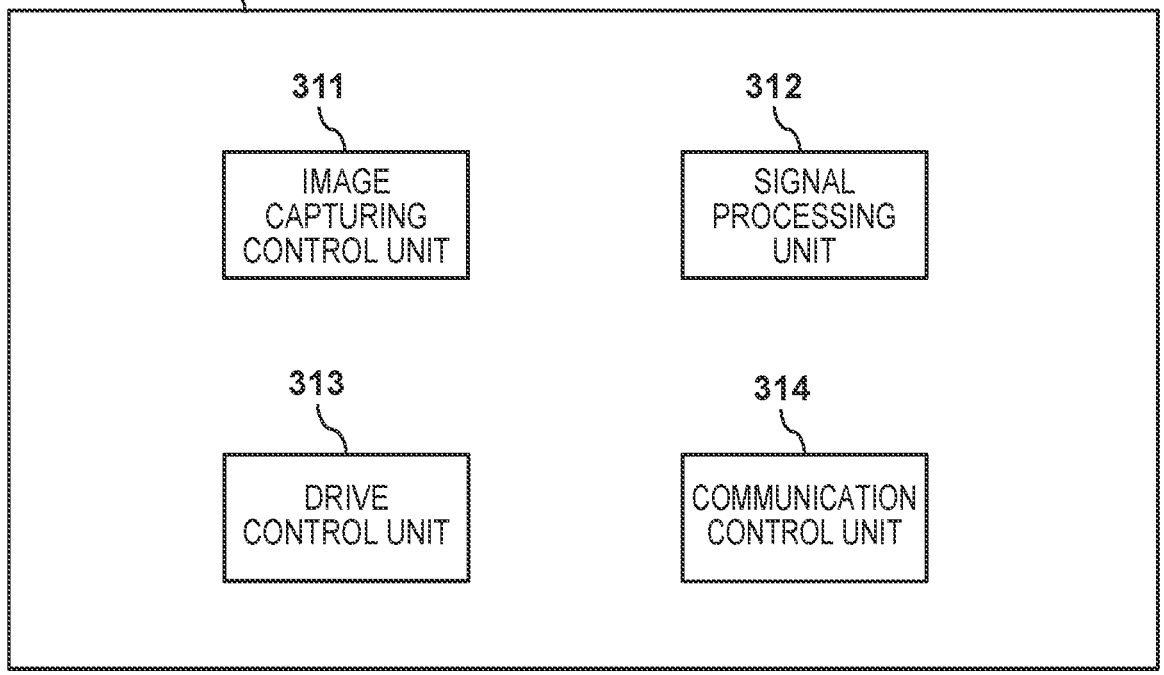
FIGS. 3A and 3B are block diagrams showing examples of the functional configurations of the image capturing device 110 and the client device 120.

An example of the functional configuration of the image capturing device 110 will be described next with reference to the block diagram of FIG. 3A. Each functional unit shown in FIG. 3A may be implemented as hardware or software (a computer program). In the latter case, each computer program is stored in the auxiliary storage device 213. The CPU 211 loads a given computer program into the main memory 212 and executes it, as needed, to implement the function of the corresponding functional unit.

The image capturing control unit 311 controls the image capturing operation of the image capturing unit 215 to acquire the movie or still image captured by the image capturing unit 215 as a captured image.

The signal processing unit 312 encodes the movie or still image acquired by the image capturing control unit 311. When the image capturing control unit 311 acquires a still image, the signal processing unit 312 encodes the still image by using an encoding scheme such as JPEG (Joint Photographic Experts Group). When the image capturing control unit 311 acquires a movie, the signal processing unit 312 encodes the movie by using an encoding scheme such as H. 264/MPEG-4 AVC (to be referred to as H. 264 hereinafter) or HEVC (High Efficiency Video Coding). Alternatively, the signal processing unit 312 may encode a movie or still image by using an encoding scheme selected from a plurality of encoding schemes set in advance by the user via, for example, an operation unit (not shown) of the image capturing device 110.

The drive control unit 313 controls the posture (image capturing direction), field angle, and the like of the image capturing unit 215 by driving the image capturing unit 215 based on the image capturing parameters received from the client device 120. As described above, the posture (image capturing direction), field angle, and the like of the image capturing unit 215 may be fixed.

The communication control unit 314 transmits a movie or still image (that has been encoded) processed by the signal processing unit 312 to the client device 120 via the network I/F 216. The communication control unit 314 also receives control instructions (including image capturing parameters) for the image capturing device 110, which have been transmitted from the client device 120, via the network I/F 216.

Figure 3B:
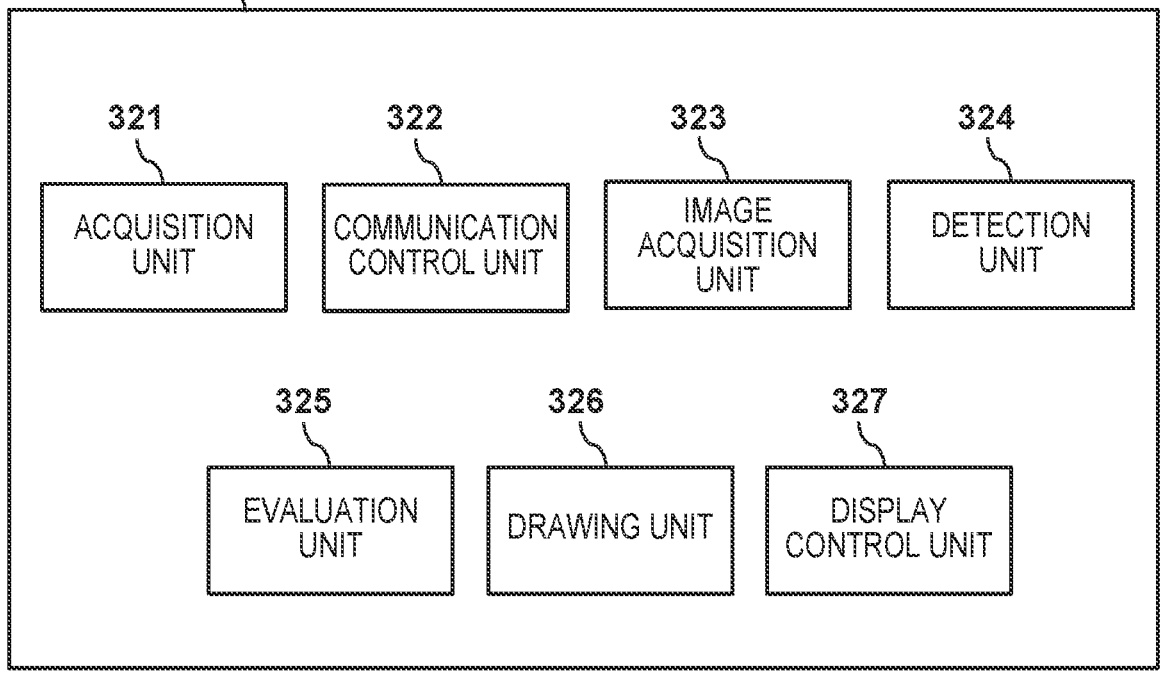

An example of the functional configuration of the client device 120 will be described next with reference to the block diagram of FIG. 3B. Each functional unit shown in FIG. 3B may be implemented as hardware or software (a computer program). In the latter case, each computer program is stored in the auxiliary storage device 223. The CPU 221 loads a given computer program into the main memory 222 and executes it, as needed, to implement the function of the corresponding functional unit.

An acquisition unit 321 acquires various types of instructions input by the user operating the input device 130. A communication control unit 322 acquires the movie or still image (that has been encoded) transmitted from the image capturing device 110 via the network I/F 226. The communication control unit 322 transmits control instructions for the image capturing device 110 to the image capturing device 110 via the network I/F 226.

An image acquisition unit 323 acquires the movie or still image which the communication control unit 322 has received from the image capturing device 110, and decodes the image. Note that the image capturing device 110 need not always encode a movie/still image, and may transmit the movie or still image to the client device 120 without encoding it. In this case, the image acquisition unit 323 acquires the movie or still image received by the communication control unit 322 from the image capturing device 110 without decoding the image.

A detection unit 324 detects a moving object from the movie or still image acquired by the image acquisition unit 323. When the region of the moving object detected from the captured image overlaps a fixed region in the captured image, an evaluation unit 325 determines, based on the image feature amount of the region of the moving object, whether to superimpose the first mask image to be drawn in the region of the moving object on the second mask image to be drawn in the fixed region.

Assume that this fixed region is set in advance. For example, the user may input information (fixed region information) defining a fixed region on a captured image and store the information in the auxiliary storage device 223 by operating the input device 130. Various types of information are conceivable as fixed region information, and the positions of the upper left corner and right lower corner of a fixed region may be set as fixed region information or the position of the upper left corner of a fixed region and the vertical and horizontal sizes of the fixed region may be set as fixed region information. Assume that in the site where this system is used, an object to be hidden in a captured image is determined in advance. In this case, a captured image may be acquired by operating the system, detection processing for an object to be hidden in the captured image may be performed, and a region where the detected object is hidden may be obtained as a fixed region. As described above, a method of setting a fixed region is not limited to a specific setting method.

A drawing unit 326 draws the first mask image in the region of a moving object on a captured image and the second mask image in a fixed region on the captured image. This drawing processing is controlled in accordance with the determination result obtained by the evaluation unit 325. A display control unit 327 causes the display device 140 to display the captured image having undergone drawing processing by the drawing unit 326.

Figure 4:
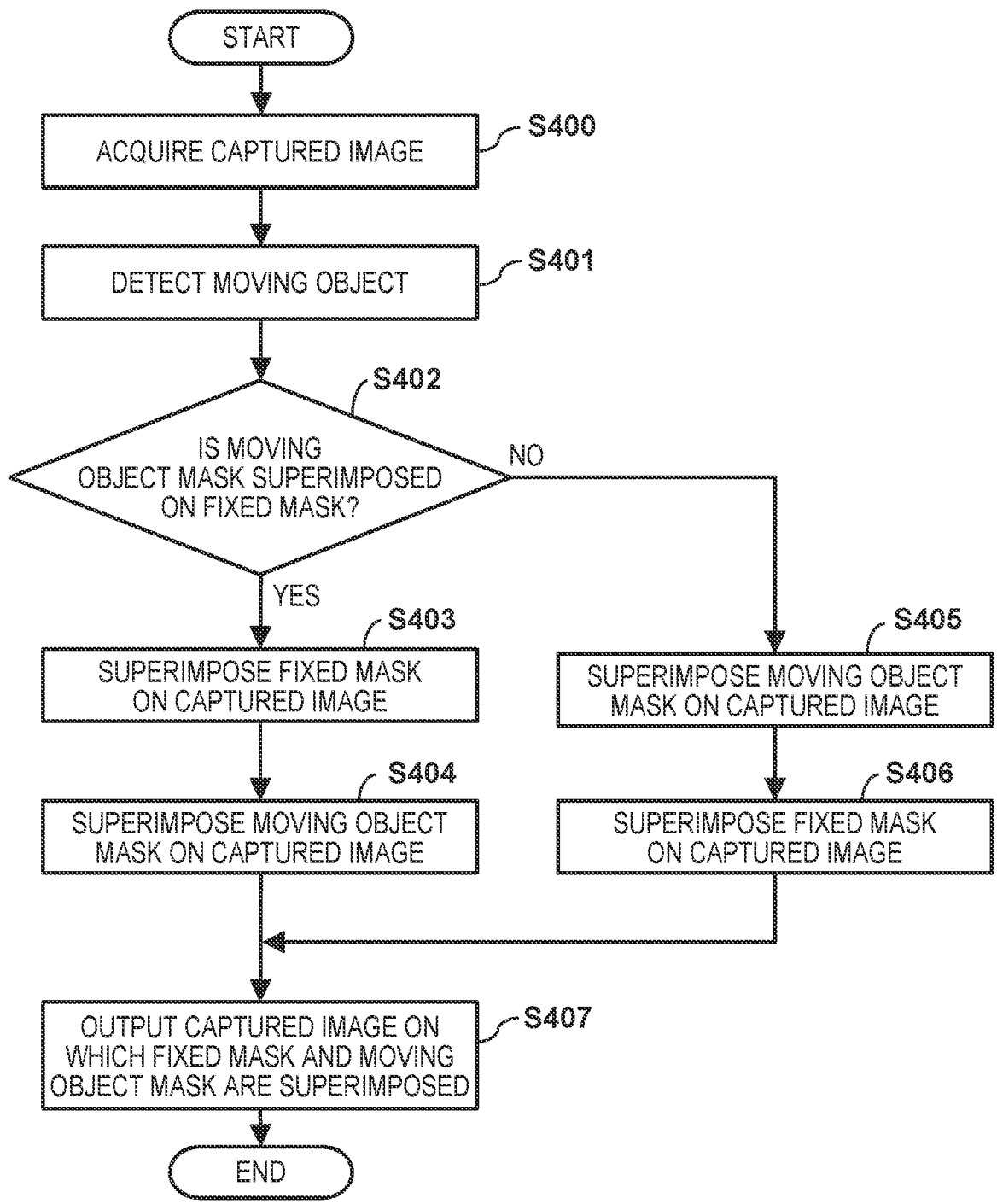
FIG. 4 is a flowchart showing processing performed by the client device 120.

Processing to be performed by the client device 120 to draw mask images in a fixed region and a moving object region on the captured image obtained by the image capturing device 110 and cause the display device 140 to display the resultant image will be described with reference to FIG. 4 showing a flowchart for the processing. Note that the processing based on the flowchart of FIG. 4 is processing concerning one captured image obtained by the image capturing device 110. When the image capturing device 110 transmits the image (captured image) of each frame constituting a movie to the client device 120, the client device 120 processes the image (captured image) of each frame based on the flowchart of FIG. 4. For the sake of simplicity, assume that in the following description, the image capturing device 110 has transmitted a movie or still image without encoding it.

In step S400, the CPU 221 stores, in the main memory 222, the captured image (the image of each frame constituting the movie or a still image) received from the image capturing device 110 via the network I/F 226.

Figure 5A:
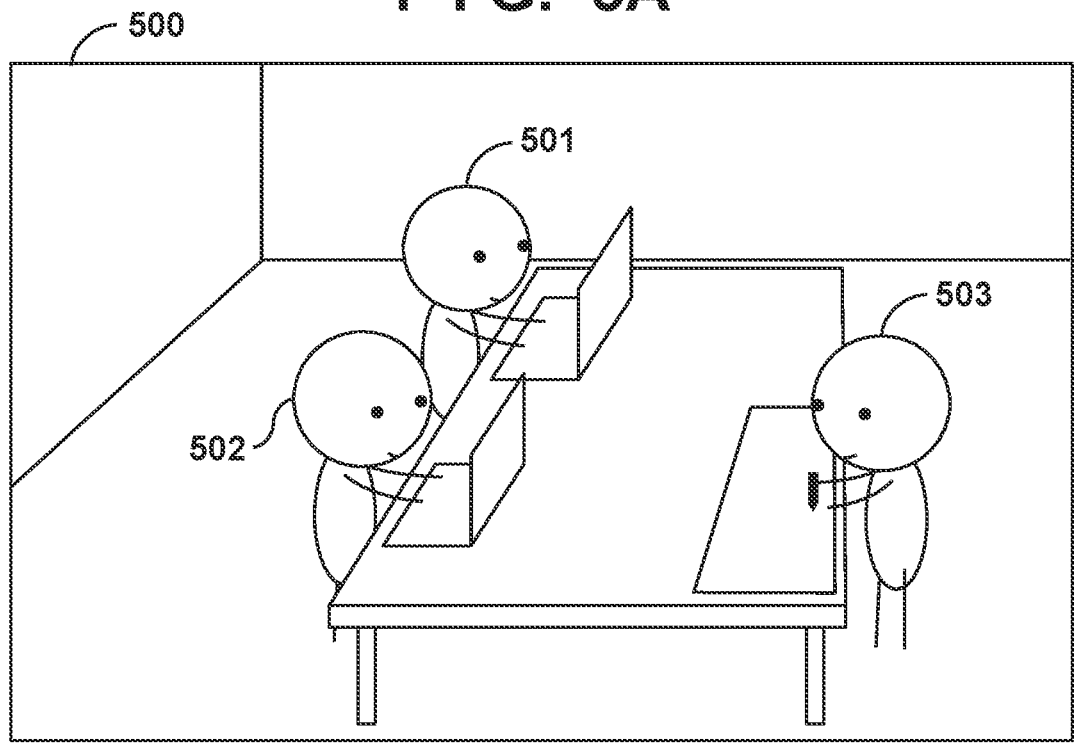
FIGS. 5A and 5B are views each showing an example of a captured image.
Figure 5B:
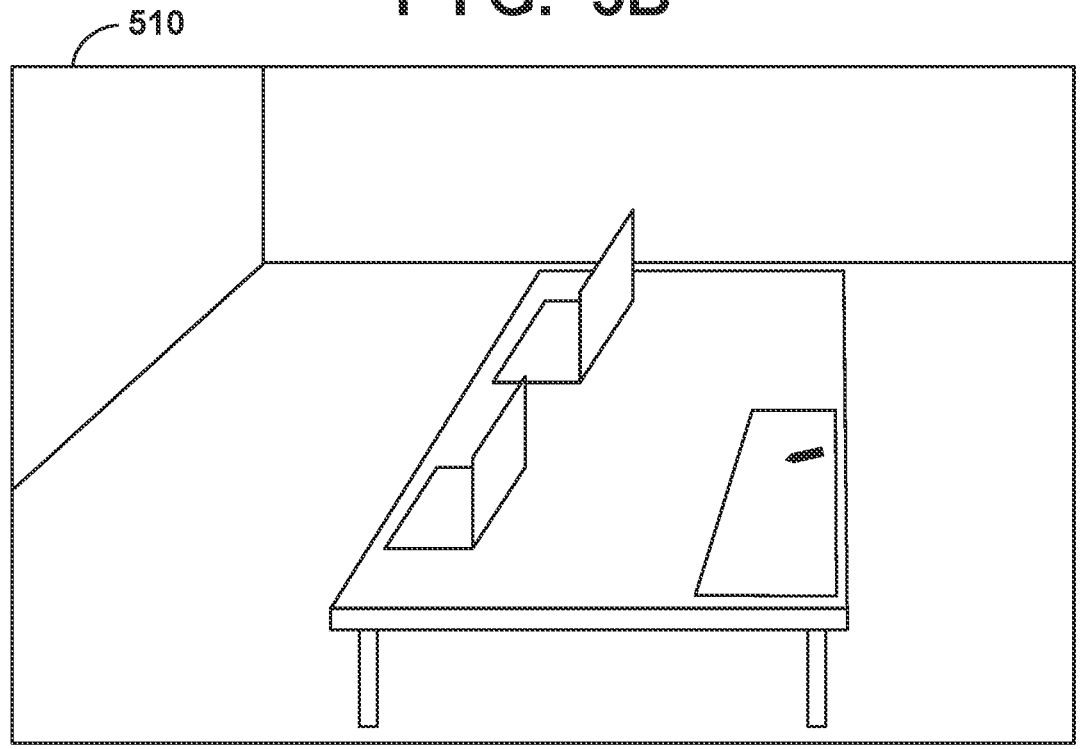

In step S401, the CPU 221 detects a moving object from the captured image acquired in the main memory 222 in step S400, and extracts the region of the detected moving object as a moving object region. FIGS. 5A and 5B each show an example of the captured image acquired in step S400. A captured image 500 in FIG. 5A is an example of a captured image containing workers 501, 502, and 503 as moving objects. A captured image 510 in FIG. 5B is an example of a captured image containing no moving object. When the captured image 500 in FIG. 5A is acquired in step S400, the CPU 221 detects the workers 501, 502, and 503 from the captured image 500 in step S401.

This embodiment uses background subtraction to detect a moving object from a captured image. That is, the embodiment calculates the differences in luminance value between pixels at corresponding positions in a background image acquired in advance and a captured image acquired and stored in the main memory 222 in step S400, and determines that a region constituted by pixels exhibiting differences exceeding a threshold is a moving object region. However, a method of detecting a moving object from a captured image is not limited to background subtraction, but other known methods may be used. For example, although luminance values are used in the embodiment, RGB values may be treated as three-dimensional coordinates, and the distances between RGB values in a background image and RGB values in a captured image may be measured as differences. In addition, it is possible to detect a moving object by calculating, for example, the moving direction of each coordinate in an image like an optical flow instead of background subtraction.

In step S402, when the moving object region overlaps the fixed region, the CPU 221 performs the determination processing of determining whether to superimpose the first mask image (moving object mask) to be drawn in the moving object region on the second mask image (fixed mask) to be drawn in the fixed region. In this embodiment, a moving object region always overlaps a fixed region. In this case, therefore, in step S402, the CPU 221 determines whether to superimpose the first mask image on the second mask image.

In this embodiment, the CPU 221 uses the image feature amount of a moving object region for this determination processing. If the image feature amount satisfies a predetermined condition, the CPU 221 determines to superimpose the first mask image on the second mask image. In contrast to this, if the image feature amount of the moving object region does not satisfy the predetermined condition, the CPU 221 determines not to superimpose the first mask image on the second mask image. Note that a value to be used as a determination criterion in step S402 is not limited to the image feature amount of a moving object region.

In this case, one of various feature amounts can be used as the image feature amount of a moving object region. For example, as the image feature amount of a moving object region, it is possible to use the area of the moving object region (the number of pixels constituting the moving object region), the area of a rectangular region enclosing the moving object region, the vertical length and/or horizontal length of the rectangular region, or the like. If the size of the moving object region/rectangular region is equal to or more than a predetermined size (for example, the area is equal to or more than a predetermined area or the vertical length and/or vertical size are equal to or more than predetermined lengths), the CPU 221 determines that the image feature amount satisfies the predetermined condition and hence determines to superimpose the first mask image on the second mask image. In contrast to this, if the size of the moving object region/rectangular region is less than the predetermined size (for example, the area is less than the predetermined area or the vertical length and/or vertical size are less than the predetermined lengths), the CPU 221 determines that the image feature amount does not satisfy the predetermined condition and hence determines not to superimpose the first mask image on the second mask image.

With this determination processing, when, for example, there is only a minute moving object such as noise in a captured image, it is possible to prevent the minute object from being detected as a moving object on which the first mask image is to be drawn. However, this is not exhaustive. For example, only a minute moving object may be set as a target on which the first mask image is to be drawn.

Upon determining in step S402 that the image feature amount of the moving object region satisfies the predetermined condition, the CPU 221 determines to superimpose the first mask image on the second mask image. The process then advances to step S403. In contrast to this, if the image feature amount of the moving object region does not satisfy the predetermined condition, the CPU 221 determines not to superimpose the first mask image on the second mask image. The process then advances to step S405.

In step S403, the CPU 221 draws the second mask image in the fixed region in the captured image acquired in step S400. In step S404, the CPU 221 draws the first mask image in the moving object region in the captured image acquired in step S400.

In step S405, the CPU 221 draws the first mask image in the moving object region in the captured image acquired in step S400. In step S406, the CPU 221 draws the second mask image in the fixed region in the captured image acquired in step S400.

In step S407, the CPU 221 outputs the captured image obtained by the drawing processing in steps S403 and S404 or in steps S405 and S406 to the display device 140 via the output I/F 225. Note that the output destination of the captured image obtained by the drawing processing in steps S403 and S404 or the drawing processing in steps S405 and S406 is not limited to any specific output destination. For example, the CPU 221 may transmit the captured image to an external apparatus via the network I/F 226.

Note that if no moving object can be detected from the captured image as a result of moving object detection in step S401, because no moving object region exists, the CPU 221 draws the second mask image on the captured image without drawing the first mask image.

Although no reference has been made to the first mask image and the second mask image in the above description, the first mask image may be an image having the shape of a moving object region or an image having the shape of a rectangular region enclosing a moving object. The second mask image is an image having a shape enclosing a fixed region. However, images that can be applied to these mask images are not limited to any specific images. For example, images filled in with predetermined patterns, for example, dot or border patterns or images filled in with one color may be used as the first and second mask images. Alternatively, for example, captured images acquired at specific timings or images registered in the auxiliary storage device 223 in advance may be used as the first and second mask images. Alternatively, a captured image and the first and second mask images may be alpha blended to draw the first and second mask images on the captured image. In addition, the first mask image and the second mask image need not be identical mask images and need not be drawn by the same drawing method.

Upon extracting a plurality of moving object regions from the captured image acquired in step S400, the CPU 221 performs the processing in steps S402 to S406 with respect to each of the moving object regions.

Figure 6A:
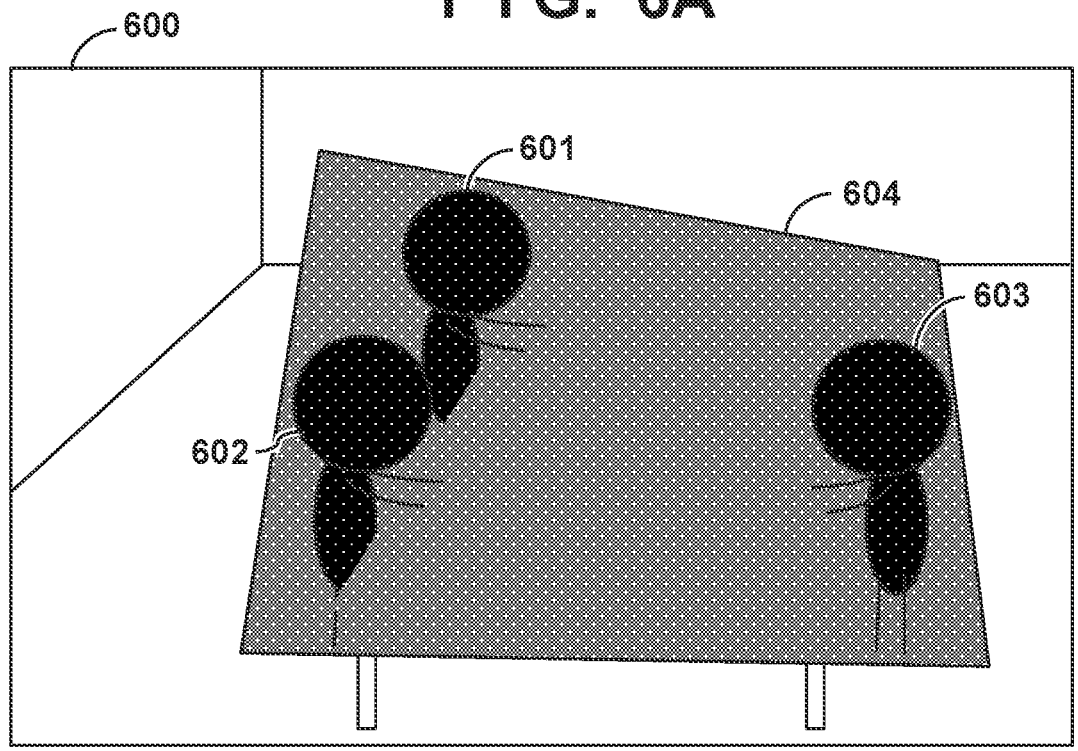
FIGS. 6A and 6B are views each showing an example of a captured image.

FIG. 6A shows an example of a captured image output to and displayed on the display device 140 in step S407 when the captured image acquired in step S400 is the captured image 500 in FIG. 5A. Because the image feature amount of each of the workers 501, 502, and 503 satisfies the predetermined condition, the CPU 221 draws first a second mask image 604 in the fixed region of the captured image 500, and then respectively draws first mask images 601, 602, and 603 in the regions of the workers 501, 502, and 503. A captured image 600 is an image obtained by such processing.

Figure 6B:
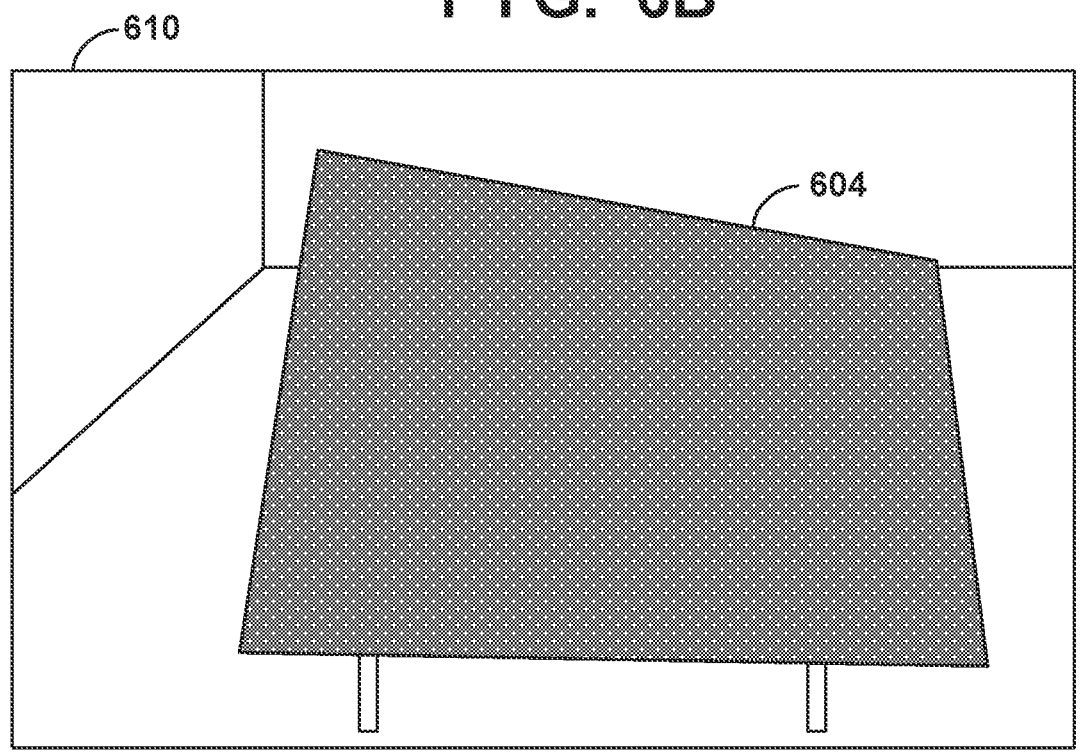

FIG. 6B shows an example of a captured image output to and displayed on the display device 140 in step S407 when the captured image acquired in step S400 is a captured image 510 in FIG. 5B. Because no moving object exists in the captured image 510, the CPU 221 draws the second mask image 604 in the fixed region of the captured image 500 without drawing any first mask image. A captured image 610 is an image obtained by such processing.

Second Embodiment

Differences between the first embodiment and each of the following embodiments including the second embodiment will be described, and the remaining parts between them are regarded as the same unless specifically referred to in the following description. In the second embodiment, the second mask image is drawn in a fixed region first, and it is then determined on which moving object, contained in a captured image, the first mask image is to be drawn. The first mask image is drawn on the moving object determined as the one on which the first mask image is to be drawn.

Figure 7:
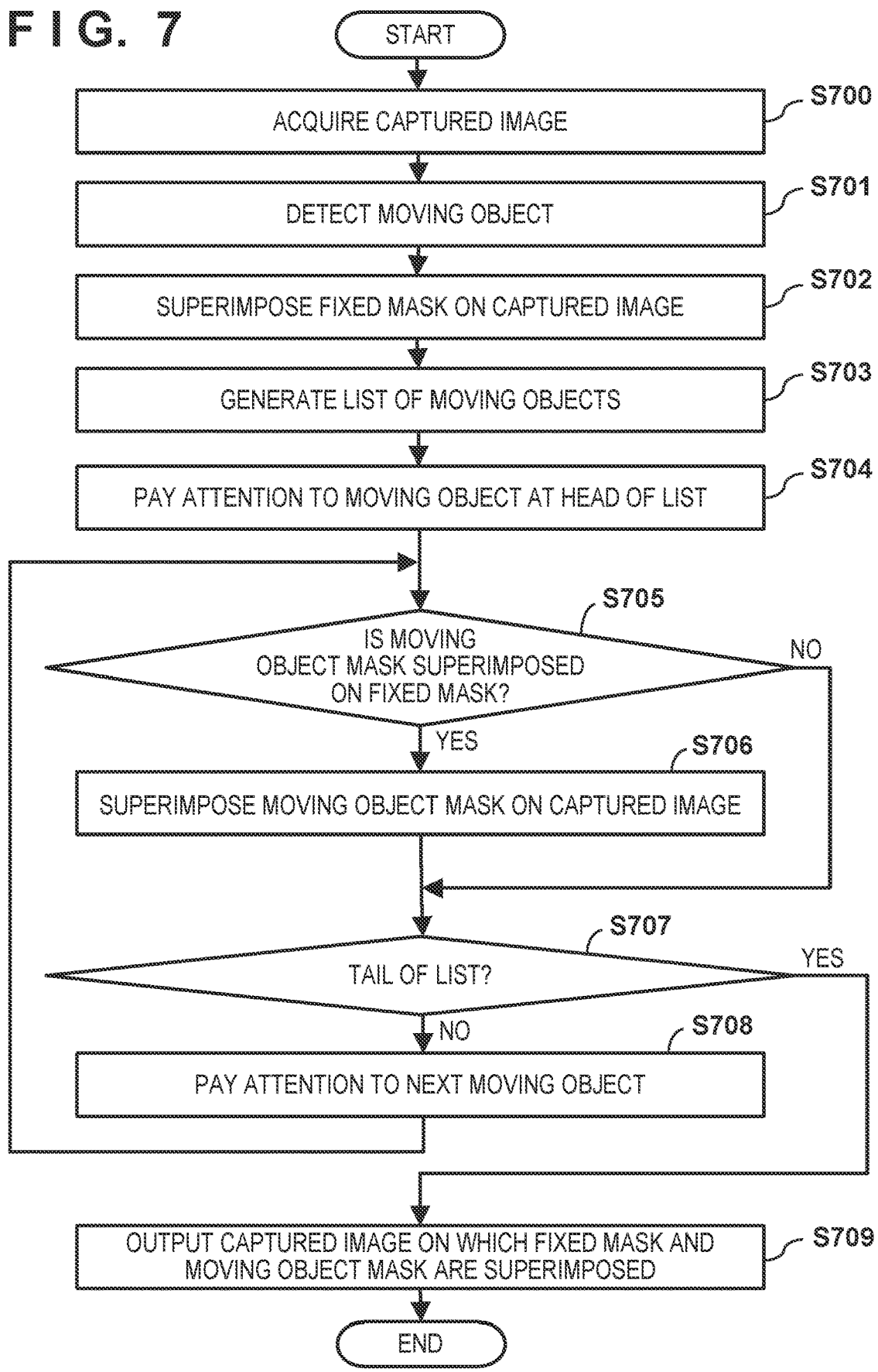
FIG. 7 is a flowchart showing processing performed by the client device 120.

Processing to be performed by a client device 120 to draw mask images in a fixed region and a moving object region on the captured image obtained by an image capturing device 110 and cause a display device 140 to display the resultant image will be described with reference to FIG. 7 showing a flowchart for the processing. Note that the processing based on the flowchart of FIG. 7 is processing concerning one captured image obtained by the image capturing device 110. When the image capturing device 110 transmits the image (captured image) of each frame constituting a movie to the client device 120, the client device 120 processes the image (captured image) of each frame based on the flowchart of FIG. 7.

Figure 8:
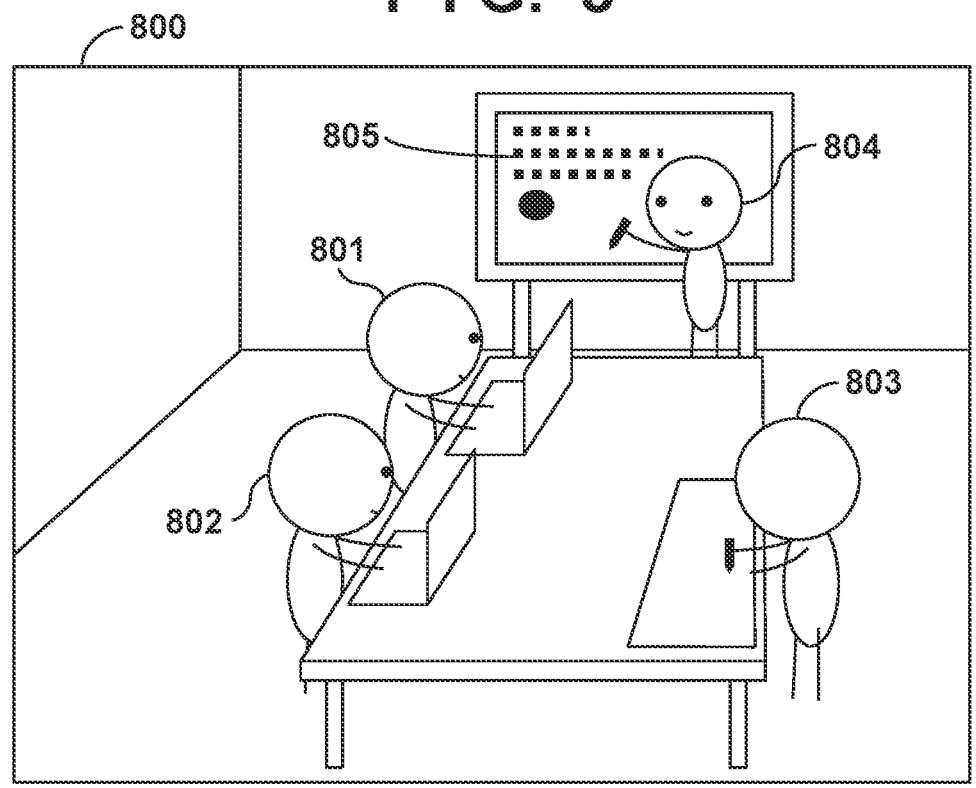
FIG. 8 is a view showing an example of a captured image.

In step S700, a CPU 221 stores, in a main memory 222, the captured image (the image of each frame constituting the movie or a still image) received from the image capturing device 110 via a network I/F 226. FIG. 8 shows an example of the captured image acquired in step S700. A captured image 800 in FIG. 8 contains workers 801, 802, 803, and 804 as moving objects and a target object 805 as a moving object. The target object 805 is a moving object generated by the operation of a worker and, for example, a graphic pattern or a set of characters drawn on a white board. In step S700, the CPU 221 initializes a variable i to be used below to 1.

Referring back to FIG. 7, in step S701, the CPU 221 detects a moving object from the captured image acquired in step S700 in the same manner as in step S401, and extracts the region of the detected moving object as a moving object region. Note that the CPU 221 assigns a unique identification number to each extracted moving object region. Assume that in this embodiment, N (N is an integer equal to or more than 2) moving object regions are extracted from a captured image, and unique indices (1 to N) are assigned to the respective extracted moving object regions. In the following description, a moving object region assigned with index=j ($1 \leq j \leq N$) is sometimes called a moving object region j.

In step S702, the CPU 221 draws the second mask image in the fixed region of the captured image acquired in step S700. In step S703, the CPU 221 generates, in the main memory 222, a list in which information defining moving object regions (for example, the position information of pixel group constituting each moving object region) respectively corresponding to indices=1 to N and the image feature amounts of the moving object regions are registered.

In step S704, the CPU 221 reads out information defining a moving object region corresponding to index=I in the list generated in the main memory 222 in step S703.

In step S705, the CPU 221 determines first whether part of all of the moving object region defined by the information read out in step S704 overlaps the fixed region. If this determination result indicates that part or all of the moving object region does not overlap the fixed region, the process advances to step S707. In contrast to this, if part or all of the moving object region overlaps the fixed region, the CPU 221 determines whether the image feature amount of the moving object region corresponding to index=I satisfies a predetermined condition. The same processing as that described in the first embodiment is performed either in "the case in which the image feature amount satisfies the predetermined condition" or "the case in which the image feature amount does not satisfy the predetermined condition".

If the determination result obtained in step S705 indicates that the image feature amount of the moving object region corresponding to index=i satisfies the predetermined condition, the CPU 221 determines to draw the first mask image in the moving object region corresponding to index=i. The process then advances to step S706. If the image feature amount of the moving object region corresponding to index=i does not satisfy the predetermined condition, the CPU 221 determines not to draw the first mask image in the moving object region corresponding to index=i. The process then advances to step S707. In step S706, the CPU 221 draws the first mask image in the moving object region defined by the information read out in step S704.

In step S707, the CPU 221 determines whether value of variable i=N. If this determination result indicates that the value of variable i=N, the CPU 221 determines that the processing in steps S705 and S706 has been performed with respect to all the moving object regions registered in the list. The process then advances to step S709. If the value of variable i<N, the CPU 221 determines that some of the moving object regions registered in the list have not undergone the processing in steps S705 and S706. The process then advances to step S708.

In step S708, the CPU 221 increments the value of the variable i by one, and performs the processing in and after step S705 with respect to the next moving object region registered in the list. The process then returns to step S705. In step S709, the CPU 221 outputs the captured image obtained by the processing up to step S708 to the display device 140 via the output I/F 225.

Figure 9:
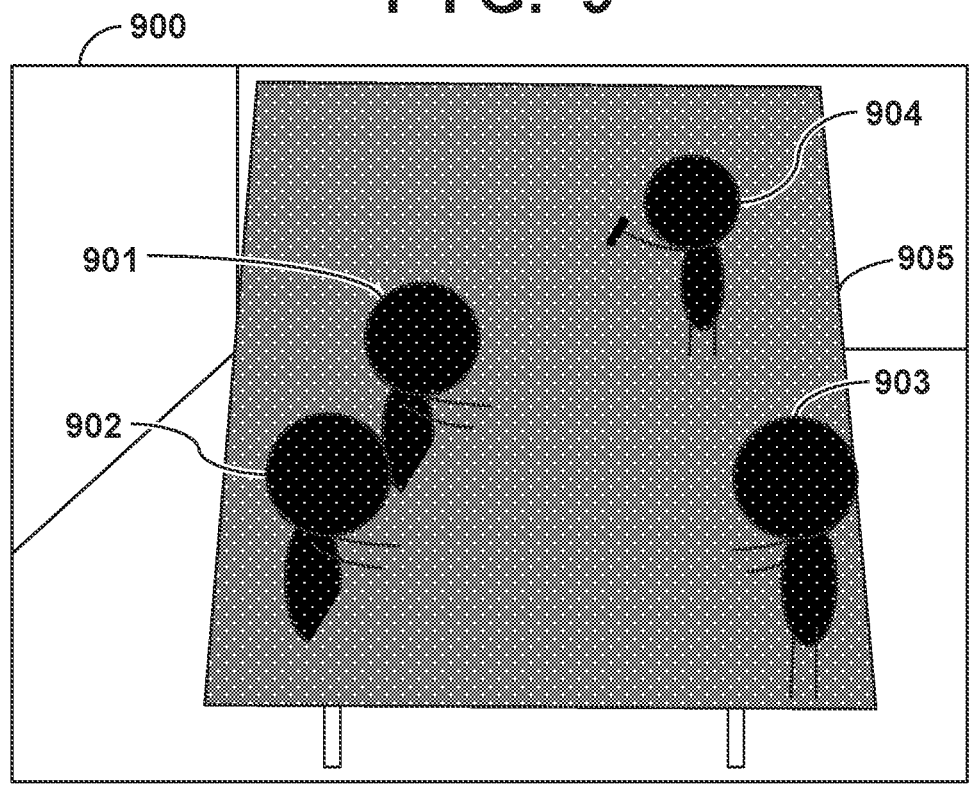
FIG. 9 is a view showing an example of a captured image.

FIG. 9 shows an example of the captured image output to and displayed on the display device 140 in step S709 when the captured image acquired in step S700 is the captured image 800 in FIG. 8. First of all, the CPU 221 draws a second mask image 905 in the fixed region of the captured image 800. Because the image feature amount of each of the workers 801, 802, 803, and 804 satisfies the predetermined condition, the CPU 221 respectively draws first mask images 901, 902, 903, and 904 in the regions of the workers 801, 802, 803, and 804. Because the image feature amount of the target object 805 has not satisfied the predetermined condition, the CPU 221 has not drawn the first mask image on the target object 805. This is because the CPU 221 determines that the image feature amount (the size in this case) of the target object 805 does not satisfy the predetermined condition because the target object 805 is a set of characters or a graphic pattern on the white board and small in size. An image obtained by such processing is a captured image 900.

Third Embodiment

The third embodiment differs from the second embodiment in that the thickness of each part of a moving object enclosed in a moving object region is used as the image feature amount of the moving object region used in step S705 in the flowchart of FIG. 7, and the first mask image is drawn on a thick part in step S706. Differences between the second embodiment and the third embodiment will be mainly described below.

In step S705, when a part or all of the moving object region overlaps the fixed region, a CPU 221 determines whether each part of the moving object enclosed in the moving object region has a thickness as an image feature amount equal to or more than a predetermined thickness. Parts constituting a moving object correspond to the head, the body, the arms, the hands, and the legs when the moving object is a person. As a technique for recognizing each part from a region in an image, there is available a known technique such as image recognition processing. In addition, there are various methods for obtaining the thicknesses of parts, and a method to be used is not limited to a specific method. For example, a small region centered on the position of a part (the central position of the part, any one of the positions of the four corners of a rectangular region enclosing the part, or the like) is set, and the proportion of the part to the small region is obtained as the thickness of the part. If the condition that the respective parts of the moving object enclosed in the moving object region include at least one part whose thickness is equal to or more than a predetermined thickness is satisfied, the process advances to step S706. If this condition is not satisfied, the process advances to step S707.

Note that a detector that has learnt small region images determined as being thick may be generated in advance, and a part detected by applying the detector to a moving object region may be determined as being a "thick part" in step S705. In this case, if there are one or more parts determined as being "thick parts", the process advances to step S706.

The CPU 221 may perform wavelet transformation with respect to a moving object region and determine that a region responding to a specific frequency is a region with a thick part. In this case, if one or more regions each determined as a "region with a thick part" exist, the process advances to step S706.

The CPU 221 may perform thin line removal processing using morphology with respect to a moving object region to determine that a part which is left without removal is a "thick part". In this case, if one or more parts each determined as a "thick part" exist, the process advances to step S706. In step S706, the CPU 221 draws the first mask image on a part having a thickness larger than a predetermined thickness (a part determined as being a thick part).

Figure 10:
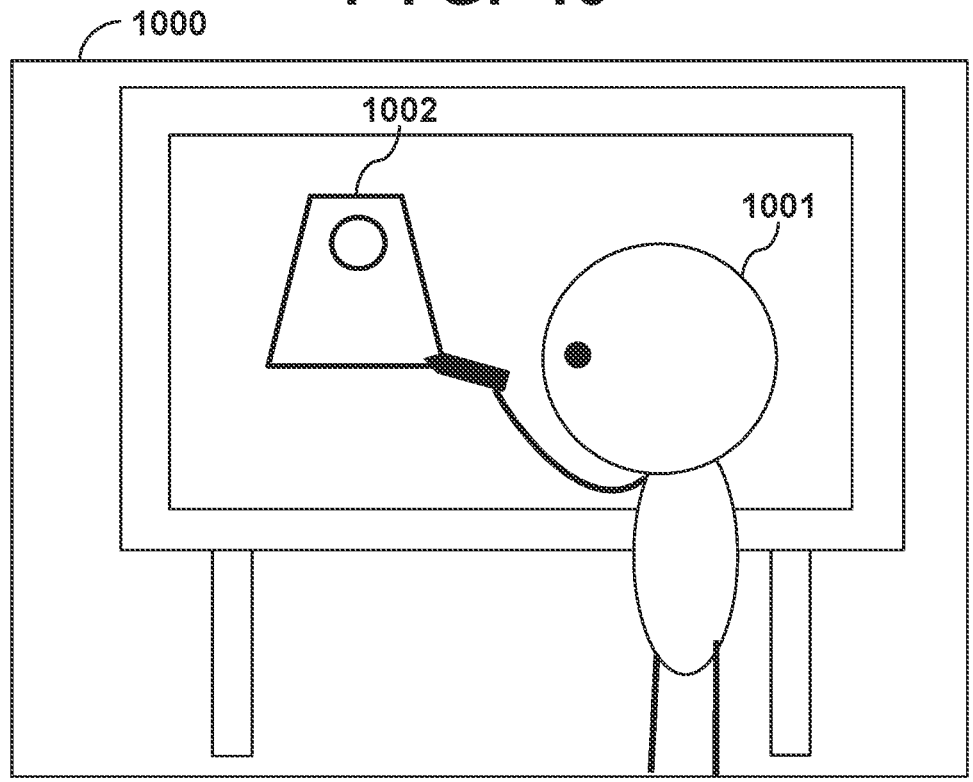
FIG. 10 is a view showing an example of a captured image.

FIG. 10 shows an example of the captured image acquired in step S700 in this embodiment. As shown in FIG. 10, a captured image 1000 contains a worker 1001 as a moving object and a target object 1002 (part of the worker 1001) that is a moving object generated by the operation of a worker and is a graphic pattern or a set of characters drawn on a white board.

Figure 11:
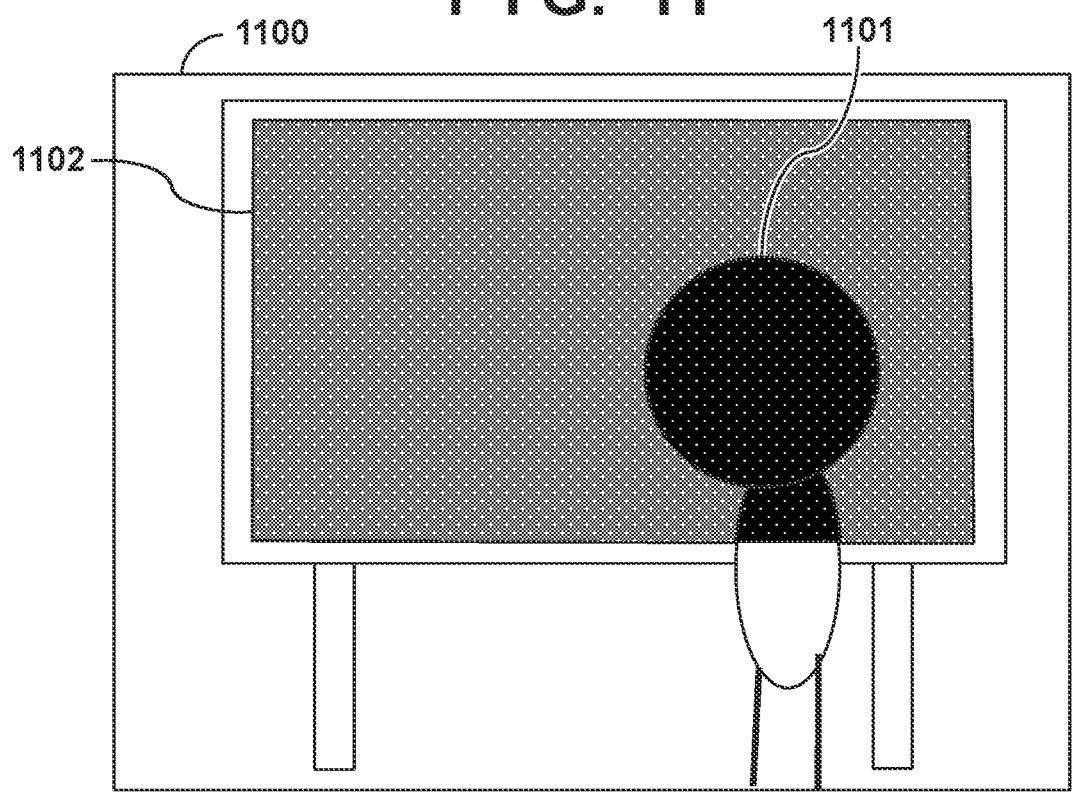
FIG. 11 is a view showing an example of a captured image.

FIG. 11 shows an example of the captured image output to and displayed on a display device 140 in step S709 when the captured image acquired in step S700 is the captured image 1000 in FIG. 10. First of all, a second mask image 1102 is drawn in the fixed region of the captured image 1000. Referring to FIG. 11, the region of the white board on the captured image 1000 is set as the fixed region in consideration of security. The CPU 221 draws a first mask image 1101 on a part (determined as being a thick part) of the respective parts of the worker 1001 which is equal to or more than a predetermined thickness.

In contrast to this, the thickness of the target object 1002 is less than the predetermined thickness, and hence the first mask image is not drawn on the region of the target object 1002. The image obtained by such processing is a captured image 1100.

As described above, one of various types of feature amounts is conceivable as the image feature amount of a moving object region. For example, the color in a moving object region may be used as the image feature amount of the moving object region. For example, upon obtaining the average pixel values of R, B, and G pixels constituting a moving object region, the CPU 221 may determine that the image feature amount of the moving object region satisfies a predetermined condition, when the obtained average values of the R, G, and B pixels respectively exceed predetermined values.

Alternatively, a period during which a moving object has moved may be used as an image feature amount. In addition, of the moving objects detected from a captured image, only "a designated moving object designated in advance as a moving object on which a mask image is to be drawn" (for example, the human body) may be set as a target in and after step S402 (S702).

A captured image need not always be acquired from the image capturing device 110. For example, the image of each frame of a movie or a still image may be acquired as a captured image from a memory device (for example, the auxiliary storage device 213 or the auxiliary storage device 223) in which recorded movies or still images are recorded.

The order of the processing to be performed when an image feature amount satisfies a predetermined condition and the processing to be performed when an image feature amount does not satisfy a predetermined condition may be reversed. Conditions set at such conditional branching may be changed as needed. Some or all of the above embodiments may be combined as needed. In addition, some or all of the above embodiments may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-199712, filed Oct. 13, 2017, which is hereby incorporated by reference herein in its entirety.

What is claimed is:

1. An image processing apparatus comprising a computer executing instructions that, when executed by the computer, cause the computer to function as:
   an output unit configured to output an image, captured by an imaging unit, on which a first mask image and a second mask image are superimposed, the first mask image corresponding to a first region of an object detected from the image and the second mask image corresponding to a second region in the image as specified by a user; and
   a determination unit configured to determine whether the first mask image corresponding to the first region overlapping the second region is to be superimposed on the second mask image corresponding to the second region, based on at least one of a size, a shape and a color of the first region overlapping the second region,
   wherein the output unit outputs, in accordance with a determination by the determination unit, the image in which the first mask image is superimposed on the second mask image if the first mask image is determined to be superimposed on the second mask image, and the image in which the first mask image is not superimposed on the second mask image if the first mask image is determined not to be superimposed on the second mask image.

2. The apparatus according to claim 1, wherein the determination unit determines that the first mask image is to be superimposed on the second mask image if at least one of the size, the shape, and the color of the first region overlapping the second region satisfies a predetermined condition.

3. The apparatus according to claim 1, wherein the determination unit determines that the first mask image corresponding to the first region that is not overlapping the second region is not superimposed on the second mask image.

4. The apparatus according to claim 1, further comprising a control unit configured to draw the first mask image determined to be superimposed on the second mask image in the first region overlapping the second region after drawing the second mask image in the second region.

5. The apparatus according to claim 4, wherein the control unit draws the second mask image in the second region after drawing the first mask image, which is determined not to be superimposed on the second mask image, in the first region overlapping the second region.

6. The apparatus according to claim 1, wherein the determination unit determines that the first mask image, corresponding to the first region which is a region of a part of the object and a region overlapping the second region, is superimposed on the second mask image, based on at least one of the size, the shape, and the color of the first region.

7. The apparatus according to claim 1, further comprising an obtaining unit configured to obtain the image captured by the imaging unit.

8. The apparatus according to claim 1, wherein the size of the first region overlapping the second region corresponds to the number of pixels constituting the first region, a size of a rectangular region enclosing the first region, or the vertical length and/or horizontal length of the rectangular region, and
   wherein the shape of the first region overlapping the second region corresponds to a thickness of each part of the object.

9. An image processing method performed by an image processing apparatus, the method comprising:

outputting an image, captured by an imaging unit, on which a first mask image and a second mask image are superimposed, the first mask image corresponding to a first region of an object detected from the image and the second mask image corresponding to a second region in the image as specified by a user; and determining whether the first mask image corresponding to the first region overlapping the second region is to be superimposed on the second mask image corresponding to the second region, based on at least one of a size, a shape, and a color of the first region overlapping the second region, wherein the outputting outputs, in accordance with the determination, the image in which the first mask image is superimposed on the second mask image if the first mask image is determined to be superimposed on the second mask image, and the image in which the first mask image is not superimposed on the second mask image if the first mask image is determined not to be superimposed on the second mask image.

10. The image processing method according to claim 9, wherein the determining determines that the first mask image is to be superimposed on the second mask image if at least one of the size, the shape, and the color of the first region overlapping the second region satisfies a predetermined condition.

11. The image processing method according to claim 9, wherein the determining determines that the first mask image corresponding to the first region that is not overlapping the second region is not superimposed on the second mask image.

12. The image processing method according to claim 9, further comprising drawing the first mask image determined to be superimposed on the second mask image in the first region overlapping the second region after drawing the second mask image in the second region.

13. The image processing method according to claim 12, wherein the drawing of the second mask image in the second region is after drawing of the first mask image, which is determined not to be superimposed on the second mask image, in the first region overlapping the second region.

14. The image processing method according to claim 9, wherein the determining determines that the first mask image, corresponding to the first region that is a region of a part of the object and a region overlapping the second region, is superimposed on the second mask image, based on at least one of the size, the shape, and the color of the first region.

15. The image processing method according to claim 9, further comprising obtaining the image captured by the imaging unit.

16. The image processing method according to claim 9, wherein the size of the first region overlapping the second region corresponds to the number of pixels constituting the first region, a size of a rectangular region enclosing the first region, or the vertical length and/or horizontal length of the rectangular region, and wherein the shape of the first region overlapping the second region corresponds to a thickness of each part of the object.

17. A non-transitory computer-readable storage medium storing a computer program for causing a computer to execute a method, the method comprising:

outputting an image, captured by an imaging unit, on which a first mask image and a second mask image are superimposed, the first mask image corresponding to a first region of an object detected from the image and the second mask image corresponding to a second region in the image as specified by a user; and determining whether the first mask image corresponding to the first region overlapping the second region is to be superimposed on the second mask image corresponding to the second region, based on at least one of a size, a shape, and a color of the first region overlapping the second region, wherein the outputting outputs, in accordance with the determination, the image in which the first mask image is superimposed on the second mask image if the first mask image is determined to be superimposed on the second mask image, and the image in which the first mask image is not superimposed on the second mask image if the first mask image is determined not to be superimposed on the second mask image.

* * * * *